United States Patent [19]

Patchornik et al.

[11] 3,919,208

[45] Nov. 11, 1975

[54] 7-(CYANOMETHYLARYL)ACETAMIDE-CEPHALOSPORIN DERIVATIVES

[75] Inventors: Abraham Patchornik, Ness-Ziona; Fortuna Haviv, Rehovot, both of Israel

[73] Assignee: Yeda Research and Development Company, Ltd., Rehovot, Israel

[22] Filed: Oct. 9, 1973

[21] Appl. No.: 404,414

[52] U.S. Cl... 260/243 C; 260/332.2 A; 260/465 D; 260/515 M; 260/516; 260/518 A; 260/519; 260/520; 260/521 A; 424/246
[51] Int. Cl.$^2$............... C07D 501/28; C07D 501/34; A61K 31/545
[58] Field of Search ............................... 260/243 C

[56] References Cited

UNITED STATES PATENTS

| | | | |
|---|---|---|---|
| 3,487,074 | 12/1969 | Sheehan | 260/239.1 |
| 3,814,754 | 6/1974 | Jackson | 260/243 C |

*Primary Examiner*—Richard J. Gallagher
*Assistant Examiner*—Diana G. Rivers
*Attorney, Agent, or Firm*—L. Ruth Hattan; Eugene O. Retter; George W. Rauchfuss, Jr.

[57] ABSTRACT

Novel 7-(cyanomethylaryl)acetamidocephalosporin derivatives useful as antibiotic agents.

12 Claims, No Drawings

7-(CYANOMETHYLARYL)ACETAMIDE-CEPHALOSPORIN DERIVATIVES

FIELD OF INVENTION

This invention relates to novel cephalosporin derivatives useful as antibiotics and processes for their preparation.

SUMMARY OF INVENTION

Compounds of the following general Formula I are used as antibiotic agents:

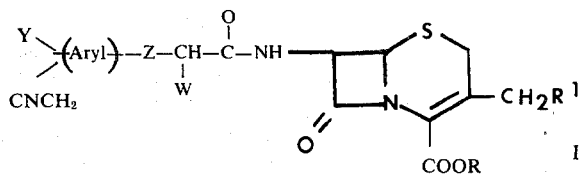

wherein Aryl represents phenyl or 2-thienyl; Y is selected from hydrogen, chlorine, bromine, straight or branched lower alkyl of from 1 to 4 carbon atoms, lower alkoxy of from 1 to 4 carbon atoms and -CH$_2$CN, with the proviso that when Aryl represents 2-thienyl, Y is hydrogen; Z represents a bond, oxygen or sulfur with the proviso that when Aryl is 2-thienyl, Z is a bond; W represents hydrogen, methyl, NH$_2$, OH, —COOH or —SO$_3$H with the proviso that when Z is oxygen or sulfur, W is other than OH; R represents hydrogen or a pharmaceutically acceptable cation or an anion charge; and R$^1$ represents hydrogen or acetoxy.

The non-toxic acid addition salts of the compounds wherein W represents NH$_2$, such as mineral acid addition salts, for example, hydrogen chloride, hydrogen bromide, hydrogen iodide, sulfate, sulfamate and phosphate and organic acid addition salts, for example, maleate, acetate, citrate, oxalate, succinate, benzoate, tartrate, fumarate, malate, mandelate and ascorbate, are also included within the scope of this invention.

Also within the scope of this invention are the non-toxic pharmaceutically acceptable salts of the compounds of general Formula I wherein W represents COOH or SO$_3$H and compounds wherein R represents hydrogen. Illustrative pharmaceutically acceptable salts of these acid derivatives are primary, secondary or tertiary amines, for example, cyclohexylamine, ethylamine and pyridine.

The pharmaceutically acceptable cations which may be present as the group R in the compounds of the general Formula I include alkali metal ions, for example, sodium ion, potassium ion, calcium ion as well as ammonium, and organic amine cations, for example, lower alkyl ammonium groups, such as, triethylammonium, and N-ethylpiperidine.

DETAILED DESCRIPTION OF INVENTION

Illustrative of straight or branched lower alkyl groups which Y may represent in compounds of the above general Formula I are methyl, ethyl, n-propyl, isopropyl, n-butyl, and tert-butyl.

Illustrative examples of lower alkoxy groups which Y may represent in compounds of general Formula I are methoxy, ethoxy, propoxy and butoxy.

When the Aryl group in the compounds of general Formula I represents phenyl, each of the substituents —CH$_2$CN and Y may be individually attached to any of the positions 2 through 6 of the phenyl ring. The preferred positions of attachment of the —CH$_2$CN group are the ortho and para-positions of the phenyl group.

When the aryl group in the compounds of general Formula I represents thienyl, it is attached to the

moiety at the 2-position of the thienyl group. The substituent as represented by —CH$_2$CN is attached at the 4 or 5-position of the thienyl group.

It is apparent from the foregoing description that the compounds of this invention are cyanomethylated phenyl substituted cephalosporin derivatives as represented by the following general Formula II,

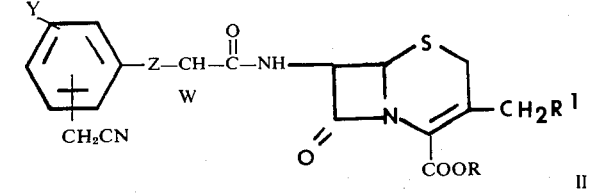

or are cyanomethylated thienyl substituted cephalosporin derivatives as represented by the following general Formula III.

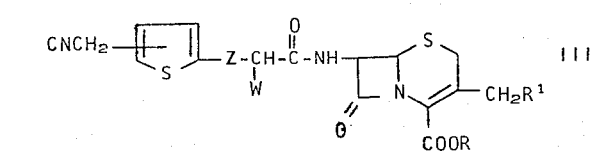

In the above general Formulas II and III, the various substituent groups as represented by Y, Z, W, R and R$^1$ have the meanings as defined in general Formula I.

The compounds of general Formula I are prepared by coupling 7-aminocephalosporanic acid or a derivative thereof having the formula

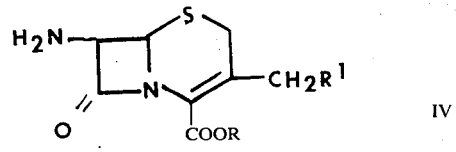

wherein R and R$^1$ have the meanings defined in general Formula I with an acid of the following Formula V or a functional equivalent thereof

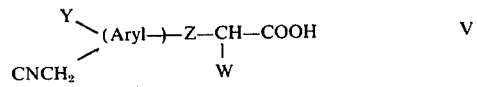

wherein Aryl, Y, Z and W have the meanings defined in general Formula I. When the substituent group W in the above Formula V represents an amino group suitable blocking groups, for example, tert-butoxycarbonyl, or carbobenzyloxy are employed to protect the amino function. Such blocking groups are removed after the coupling reaction by methods generally known in the art, for example, as described by Lemieux et al., in U.S. Pat. No. 3,657,232.

Functional equivalents of the acids as represented by Formula V include the acid halides, for example, the acid chloride, acid anhydrides, including mixed anhydrides with, for example, alkylphosphoric acids, lower aliphatic monoesters of carbonic acid, or alkyl or aryl sulfonic acids. Additionally, the acid azide or an active ester or thioester, for example, with p-nitrophenol, 2,4-dinitrophenol, or thioacetic acid, may be used, or the free acid as represented by Formula V may be coupled with the 7-aminocephalosporanic acid derivative as represented by Formula IV after first reacting the acid with N,N'-dimethylchloroforminium chloride or by use of a carbodiimide reagent, for example, N,N'-diisopropylcarbodiimide, N,N'-dicyclohexylcarbodiimide, or N-cyclohexyl-N'-(2-morpholinoethyl)carbodiimide.

The coupling reaction is generally carried out in the presence of a solvent. Suitable solvents include ethyl acetate, acetone, dioxane, acetonitrile, chloroform, ethylene chloride, tetrahydrofuran and dimethylformamide. As hydrophilic solvents are employed mixtures of these solvents with water are also suitable for the above reaction. The coupling reaction is generally carried out in the presence of a base, for example, an alkali bicarbonate. The temperature of the reaction may vary from −10° to 100°C, and the reaction time may vary from about ½ hour to 10 hours. The cephalosporin products are isolated by conventional methods.

The compounds of general Formula I may also be prepared by combining a modified polystyrene containing nitrophenol or hydroxysuccinimide groups with an acid of general Formula V and mixing the activated acid thus formed with a compound of general Formula IV by the general procedure described in Canadian Pat. No. 892,580, issued Feb. 8, 1972, by substituting a compound of general Formula IV for the penicillanic acid derivatives described therein.

The salt forms of Formula I wherein R is a pharmaceutically acceptable cation are prepared in the manner recognized in the art and may be formed in situ or by reacting the corresponding acid with base, for example, sodium bicarbonate or triethylamine.

The individual optical isomers of the compounds of general Formula I wherein W represents methyl, $NH_2$, OH, COOH or $SO_3H$ are also included within the scope of this invention.

The compounds of general Formula IV, that is, 7-aminocephalosporanic acid and 7-aminodesacetoxycephalosporanic acid and salts thereof are commercially available or may be obtained from Cephalosporin C by procedures well known in the art.

The cyanomethylated aromatic acids as represented by general Formula V are prepared from the corresponding halomethylated acids as represented by the following Formula VI, which are described in copending application Ser. No. 400,560, filed Sept. 25, 1973, and incorporated herein by reference thereto:

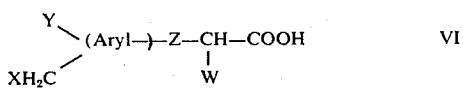

VI wherein Aryl, Y, Z, and W have the meanings defined in general Formula I except that Y is not $CH_2CN$ but may additionally be $CH_2X$, and $CH_2X$ represents halomethyl wherein X is chlorine, bromine or fluorine. By treating a compound of Formula VI with sodium cyanide or potassium cyanide in a solvent, such as, a lower alcohol, for example, methanol, ethanol, isopropyl alcohol or n-butanol, or dimethylsulfoxide dimethylformamide or aqueous mixtures of these solvents, for from ½ hour to 24 hours at a temperature ranging from 0° to 125°C, the corresponding cyanomethylated aromatic acids of Formula V are prepared and can be isolated by conventional procedures. In some instances it may be more convenient to convert the acid as represented by Formula VI to the corresponding methyl ester by, for example, treating the acid with diazomethane at −10°C then stirring the mixture for about 10 to 30 minutes at room temperature.

When the substituent group W in compounds of Formula VI represents amino, the amino group is protected by a suitable blocking group, for example, tert-butoxycarbonyl prior to treatment with sodium cyanide or potassium cyanide. Upon completion of the halosubstitution reaction, the product is coupled with 7-aminocephalosporanic acid. At last the blocking group may be removed by mild acid hydrolysis or hydrogenolysis by procedures known in the art.

In the preparation of compounds of Formula V wherein W represents OH it may be advantageous to protect the OH group prior to treating the acid with sodium cyanide or potassium cyanide by a suitable group as described by B. Reichert, et al., Pharmazie 5, 10 (1950).

The novel compounds of this invention are useful as antibiotic agents as demonstrated by their activity against gram positive and gram negative bacteria in vitro and in vivo and fungi. The compounds of this invention are particularly useful in that they possess a longer duration of activity than many of the well known cephalosporin compounds. Also, as is well known in the art, cephalosporin compounds generally have an unpleasant taste. The compounds described herein possess a markedly improved taste.

The compounds of this invention may be administered alone or in the form of pharmaceutical preparations either orally, parenterally and topically. They may be administered to warm blooded animals, that is, birds and mammals, for example, felines, canines, bovines, and equines, and humans. For oral administration the compounds may be administered in the form of tablets, capsules or pills or in the form of elixirs or suspensions. For parenteral administration they are best used in the form of a sterile aqueous solution which may contain other solutes, for example, enough saline or glucose to make the solution isotonic. For topical administration the compounds may be incorporated into creams or ointments.

Illustrative examples of bacteria against which the compounds of this invention are active are *Staphylococcus aureus*, *Salmonella schottmulleri*, *Klebsiella pneumoniae*, *Diplococcus pneumonia*, and *Streptococcus pyogenes*.

The compounds of this invention as described by general Formula II are cyanomethylated phenylacetamido-, cyanomethylated phenoxyacetamido-, and cyanomethylated phenylthioacetamido cephalosporin derivatives wherein the phenyl ring may be further substituted with straight or branched alkyl containing from 1 to 4 carbon atoms, alkoxy containing from 1 to 4 carbon atoms, chlorine, bromine or -$CH_2CN$. When Y represents hydrogen in the compounds of general Formula II, the phenyl ring could also be substituted with hydroxy or trifluoromethyl.

The compounds of this invention as represented by general Formula III are cyanomethylated 2-thienylacetamido cephalosporin derivatives.

A preferred group of compounds of this invention are represented by the following Formula VII:

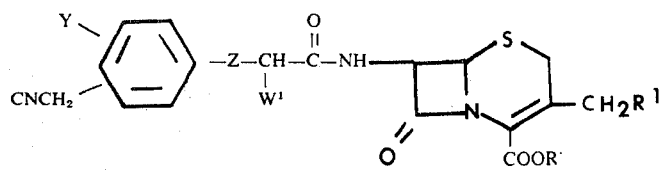

VII wherein $W^1$ represents hydrogen, methyl, amino or hydroxy; and Y, Z, R and $R^1$ have the meanings defined in general Formula I.

A more preferred group of compounds of this invention are those of general Formula VII wherein Y represents hydrogen or alkoxy of from 1 to 4 carbon atoms; and $W^1$, R and $R^1$ have the meanings defined in general Formula VII.

A still more preferred group of compounds of this invention are those of general Formula VII wherein Y represents hydrogen, alkoxy of from 1 to 4 carbon atoms; Z represents a bond; and $W^1$, R and $R^1$ have the meanings defined in general Formula VII.

Another preferred group of compounds of this invention are represented by the following Formula VIII:

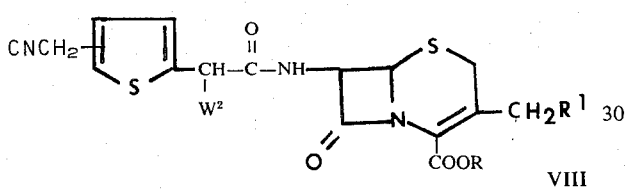

VIII wherein $W^2$ represents hydrogen or methyl, and R and $R_1$ have the meanings defined in general Formula I.

The following examples are illustrative of the invention.

EXAMPLE 1 p-Cyanomethylphenylacetyl chloride

A. A solution of 1 g of p-chloromethylphenylacetic acid and 2 g of sodium cyanide in 30 ml of methanol is refluxed for 4 hours after which the solvent is removed under vacuum using a rotary evaporator. The remaining residue is dissolved in a mixture of 250 ml of methylene chloride and 50 ml of water and acidified with a 10 percent hydrochloric acid solution to pH 2-3. The organic phase is separated and the aqueous phase is extracted with methylene chloride. The combined organic fractions are dried over anhydrous sodium sulfate, filtered and concentrated under vacuum. The resulting product is purified by column chromatography using silica gel, eluting with benzene and benzene-acetone, whereupon p-cyanomethylphenylacetic acid is obtained and recrystallized from ether-chloroform. M.P. 123°–125°C.

B. A mixture of 0.58 g of p-cyanomethylphenylacetic acid in 3 ml of thionyl chloride is stirred at room temperature for 25 hours, after which the excess thionyl chloride is removed to give p-cyanomethylphenylacetyl chloride.

EXAMPLE 2

When in the procedure of Example 1 (A) an equivalent amount of one of the halomethylated acids listed below is substituted for p-chloromethylphenylacetic acid, the corresponding cyanomethylated acid listed below is obtained.

| halomethylated acid | cyanomethylated acid |
|---|---|
| p-chloromethylphenoxyacetic acid | p-cyanomethylphenoxyacetic acid |
| 2,4-bis(chloromethyl)-phenoxyacetic acid | 2,4-bis(cyanomethyl)-phenoxyacetic acid |
| 4-chloromethyl-2-thienylacetic acid | 4-cyanomethyl-2-thienylacetic acid |
| 5-chloromethyl-2-thienylacetic acid | 5-cyanomethyl-2-thienylacetic acid |
| o-chloromethyl-p-methoxymandelic acid | o-cyanomethyl-p-methoxymandelic acid |
| p-chloromethylphenylglycine (wherein the amine group is protected by tert-butoxycarbonyl) | p-cyanomethylphenylglycine (containing tert-butoxycarbonyl on the amine group) |
| p-chloromethylphenyl-α-carboxyacetic acid | p-cyanomethylphenyl-α-carboxyacetic acid |
| 5-chloromethyl-α-hydroxy-2-thienylacetic acid | 5-cyanomethyl-α-hydroxy-2-thienylacetic acid |
| o-chloro-p-chloromethylphenylacetic acid | o-chloro-p-cyanomethylphenylacetic acid |
| o-chloromethyl-p-isopropylphenoxyacetic acid | o-cyanomethyl-p-isopropylphenoxyacetic acid |
| p-chloromethyl-o-methylphenoxyacetic acid | p-cyanomethyl-o-methylphenoxyacetic acid |
| o-chloro-p-chloromethylphenylthioacetic acid | o-chloro-p-cyanomethylphenylthioacetic acid |
| p-chloromethyl-α-methylphenylacetic acid | p-cyanomethyl-α-methylphenylacetic acid |
| 5-chloromethyl-α-carboxy-2-thienylacetic acid | 5-cyanomethyl-α-carboxy-2-thienylacetic acid |

Each of the cyanomethylated acids obtained above upon treatment with thionyl chloride according to the procedure of Example 1 (B) is converted to the corresponding acid chloride.

EXAMPLE 3 o-Cyanomethylphenylacetyl chloride

To 100 ml of an ethereal solution of diazomethane is added dropwise at −10°C, 50 ml of an ethereal solution of o-bromophenylacetic acid (0.55 g). The mixture is stirred at room temperature for 10 minutes after which the solvent and excess diazomethane are removed under high vacuum at room temperature to give methyl o-bromomethylphenylacetate as an oil.

A solution of methyl o-bromomethylphenylacetate (about 0.575 g) in 25 ml of methanol is refluxed for 4 hours in the presence of 1.14 g of sodium cyanide after which the solvent is removed under vacuum. The residue is dissolved in a mixture of 200 ml of methylene chloride and 100 ml of water. The aqueous phase is acidified to pH 2 at 0°C using concentrated hydrochloric acid then extracted with methylene chloride. The combined organic fractions are dried over sodium sulfate, filtered, and concentrated yielding a semisolid residue which is chromatographed on silica gel using benzene and benzene-acetone as the eluant to give o-cyanomethylphenylacetic acid.

The above obtained o-cyanomethylphenylacetic acid is converted to the acid chloride by treating with thionyl chloride according to the procedure set forth in Example 1 (B).

EXAMPLE 4

3-[(Acetyloxy)methyl]-7-[[2-[4-(cyanomethyl)-phenyl]acetyl]-amino]-8-oxo-5-thia-1-azabicyclo-[4.2.0]oct-2-ene-2-carboxylic acid A mixture of 0.5 g of p-cyanomethylphenylacetyl chloride and 0.5 g of 7-aminocephalosporanic acid in 25 ml of ethyl acetate is refluxed for about 2 hours after which the solvent is removed under vacuum. the remaining oily product is chromatographed on silica gel using benzeneacetone as the eluant to give 3-[(acetyloxy)methyl]-7-[[2-[4-(cyanomethyl)phenyl]-acetyl]amino]-8-oxo-5-thia-1-azabicyclo[4.2.o]-oct-2-ene-2-carboxylic acid. M.P. 123–125°C (dec.).

EXAMPLE 5

7-[[2-[4-(Cyanomethyl)phenyl]acetyl]amino]-3-methyl-8-oxo-5-thia-1-azabicyclo[4.2.0]oct-2-ene-2-carboxylic acid A mixture of 0.9 g of p-cyanomethylphenylacetyl chloride and 0.9 g of 7-aminodesacetoxycephalosporanic acid in 50 ml of ethyl acetate is refluxed for about 50 minutes after which the solvent is removed under vacuum. The remaining semisolid product is chromatographed on silica gel using benzene-acetone as the eluant to give 7-[[2-[4-(cyanomethyl)phenyl]acetyl]-amino]-3-methyl-8-oxo-5-thia-1-bicyclo[4.2.0]oct-2-ene-2-carboxylic acid. M.P. 168–170°C.

EXAMPLE 6

3-[(Acetyloxy)methyl]-7-[[2-[2-(cyanomethyl)-phenyl]acetyl]amino]-8-oxo-5-thia-1-azabicyclo-[4.2.0]oct-2-ene-2-carboxylic acid A mixture of 0.03 g of 7-aminocephalosporanic acid and 0.029 g of o-cyanomethylphenylacetyl chloride in 30 ml of ethyl acetate is refluxed for about 50 minutes after which the solvent is removed under vacuum. The remaining residue is chromatographed on silica gel using benzeneacetone as the eluant to give 3-[(acetyloxy)methyl]-7-[[2-[2-(cyanomethyl)phenyl]-acetyl]amino]-8-oxo-5-thia-1-azabicyclo[4.2.0]oct-2-ene-2-carboxylic acid, after trituration with ether.

EXAMPLE 7

7-[[2-[2-(Cyanomethyl)phenyl]acetyl]amino]-3-methyl-8-oxo-5-thia-1-azabicyclo[4.2.0]oct-2-ene-2-carboxylic acid A mixture of 0.175 g of o-cyanomethylphenylacetyl chloride and 0.175 g of 7-aminodesacetoxycephalosporanic acid in 40 ml of ethyl acetate is refluxed for about 50 minutes after which the solvent is removed under vacuum. The remaining oily residue is chromatographed on silica gel using benzene-acetone as the eluant to give 7-[[2-[2-(cyanomethyl)phenyl]acetyl]-amino]-3-methyl-8-oxo-5-thia-1-azabicyclo[4.2.0]oct-2-ene-2-carboxylic acid, after trituration with hexane.

EXAMPLE 8

When in the procedure of Example 4, an equivalent amount of each of the cyanomethylated acid chlorides described in Example 2 is substituted for p-cyanomethylphenylacetyl chloride the following respective products are obtained:

3-[(acetyloxy)methyl]-7-[[2-[4-(cyanomethyl)-phenoxy]acetyl]amino]-8-oxo-5-thia-1-azabicyclo[4.2.0]oct-2-ene-2-carboxylic acid, 3-[(acetyloxy)methyl]-7-[[2-[2,4-bis(cyanomethyl)-phenoxy]acetyl]amino]-8-oxo-5-thia-1-azabicyclo-[4.2.0]oct-2-ene-2-carboxylic acid, 3-[(acetyloxy)methyl]-7-[[2-[4-(cyanomethyl)-2-thienyl]acetyl]amino]-8-oxo-5-thia-1-azabicyclo-[4.2.0]oct-2-ene-2-carboxylic acid, 3-[(acetyloxy)methyl]-7-[[2-[5-(cyanomethyl)-2-thienyl]acetyl]amino]-8-oxo-5-thia-1-azabicyclo[4.2.0]oct-2-ene-2-carboxylic acid, 3-[(acetyloxy)methyl]-7-[[2-[2-(cyanomethyl)-4-methoxyphenyl]-2-hydroxyacetyl]amino]-8-oxo-5-thia-1-azabicyclo[4.2.0]oct-2-ene-2-carboxylic acid, 3-[(acetyloxy)methyl]-7-[[2-[4-(cyanomethyl)-phenyl]-2-aminoacetyl]amino]-8-oxo-5-thia-1-azabicyclo[4.2.0]oct-2-ene-2-carboxylic acid (preparation requires the additional step of removing the tert-butoxycarbonyl group by mild acid hydrolysis), 3-[(acetyloxy)methyl]-7-[[2-[4-(cyanomethyl)-phenyl]-2-carboxyacetyl]amino]-8-oxo-5-thia-1-azabicyclo[4.2.0]oct-2-ene-2-carboxylic acid, 3-[(acetyloxy)methyl]-7-[[2-[5-(cyanomethyl)-2-thienyl]-2-hydroxyacetyl]amino]-8-oxo-5-thia-1-azabicyclo[4.2.0]oct-2-ene-2-carboxylic acid.

3-[(acetyloxy)methyl]-7-[[2-[4-(cyanomethyl)-2-chlorophenyl]acetyl]amino]-8-oxo-5-thia-1-azabicyclo[4.2.0]oct-2-ene-2-carboxylic acid, 3-[(acetyloxy)methyl]-7-[[2-[4-(isopropyl)-2-cyanomethylphenyl]acetyl]amino]-8-oxo-5-thia-1-azabicyclo[4.2.0]oct-2-ene-2-carboxylic acid, 3-[(acetyloxy)methyl]-7-[[2-[4-(cyanomethyl)-2-methylphenoxy]acetyl]amino]-8-oxo-5-thia-1-azabicyclo[4.2.0]oct-2-ene-2-carboxylic acid, 3-[(acetyloxy)methyl]-7-[[2-[4-(cyanomethyl)-2-chlorophenylthio]acetyl]amino]-8-oxo-5-thia-1-azabicyclo[4.2.0]oct-2-ene-2-carboxylic acid, 3-[(acetyloxy)methyl]-7-[[2-[4-(cyanomethyl)-phenyl]-2-methylacetyl]amino]-8-oxo-5-thia-1-azabicyclo[4.2.0]oct-2-ene-2-carboxylic acid, 3-[(acetyloxy)methyl]-7-[[2-[5-(cyanomethyl)-2-thienyl]-2-carboxyacetyl]amino]-8-oxo-5-thia-1-azabicyclo[4.2.0]oct-2-ene-2-carboxylic acid.

The corresponding 7-aminodesacetoxycephalosporanic dreivatives of each of the above named compounds are obtained when an equivalent amount of 7-aminodesacetoxycephalosporin acid is substituted for 7-aminocephalosporanic acid in the procedure as described in Example 4.

We claim:
1. A compound of the formula

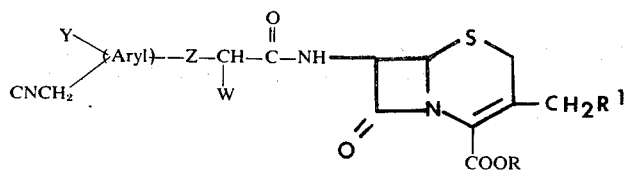

wherein Aryl is selected from phenyl or 2-thienyl; Y is selected from hydrogen, chlorine, bromine, straight or branched lower alkyl of from 1 to 4 carbon atoms, lower alkoxy of from 1 to 4 carbon atoms, or -$CH_2CN$ with the proviso that when Aryl represents 2-thienyl, Y is hydrogen; Z is selected from a bond, oxygen or sulfur with the proviso that when Aryl is 2-thienyl, Z is a bond; W is selected from hydrogen, methyl, hydroxy, amino, -COOH, or -$SO_3H$ with the proviso that when Z is oxygen or sulfur, W is other than hydroxy; R is selected from hydrogen or a pharmaceutically acceptable cation; and $R_1$ is selected from hydrogen or acetoxy.

2. A compound of claim 1 wherein Aryl is 2-thienyl.

3. A compound of claim 2 wherein W is selected from hydrogen or methyl.

4. A compound of claim 1 wherein Aryl is phenyl.

5. A compound of claim 4 wherein W is selected from hydrogen, methyl, amino or hydroxy.

6. A compound of claim 5 wherein Z is a bond.

7. A compound of claim 6 wherein Y is selected from hydrogen or lower alkoxy.

8. A compound of claim 7 which is 3-[(acetyloxy)methyl]-7-[[2-[4-(cyanomethyl)phenyl]acetyl]amino]-8-oxo-5-thia-1-azabicyclo[4.2.0]oct-2-ene-2-carboxylic acid or a pharmaceutically acceptable salt thereof.

9. A compound of claim 7 which is 7-[[2-[4-(cyanomethyl)phenyl]acetyl]amino]-3-methyl-8-oxo-5-thia-1-azabicyclo[4.2.0]oct-2-ene-2-carboxylic acid or a pharmaceutically acceptable salt thereof.

10. A compound of claim 7 which is 3-[(acetyloxy)methyl]-7-[[2-[2-cyanomethyl)phenyl]acetyl]amino]-8-oxo-5-thia-1-azabicyclo[4.2.0]oct-2-ene-2-carboxylic acid or a pharmaceutically acceptable salt thereof.

11. A compound of claim 5 wherein Z is oxygen or sulfur.

12. A compound of claim 11 wherein Y is selected from hydrogen or lower alkoxy.

* * * * *

UNITED STATES PATENT AND TRADEMARK OFFICE
CERTIFICATE OF CORRECTION

PATENT NO. : 3,919,208
DATED : November 11, 1975
INVENTOR(S) : Abraham Patchornik et al It is certified that error appears in the above-identified patent and that said Letters Patent are hereby corrected as shown below:

Column 1, line 15

Column 2, line 20 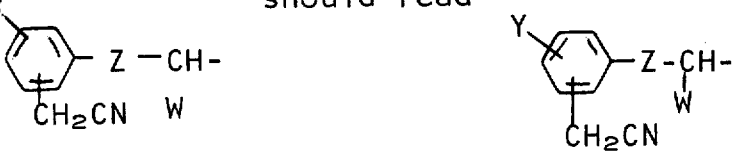

Signed and Sealed this

Thirty-first Day of August 1976

[SEAL]

Attest:

RUTH C. MASON
Attesting Officer

C. MARSHALL DANN
Commissioner of Patents and Trademarks